United States Patent
Jenney et al.

(10) Patent No.: US 7,495,545 B2
(45) Date of Patent: Feb. 24, 2009

(54) PALLET CONTENT IDENTIFICATION MECHANISM THAT CONVERTS RFID INFORMATION TO CORRESPONDING BARCODE INFORMATION

(75) Inventors: Eric H. Jenney, Rochester, MN (US); Matthew Ryan Weaver, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/103,759

(22) Filed: Apr. 16, 2008

(65) Prior Publication Data

US 2008/0217405 A1    Sep. 11, 2008

Related U.S. Application Data

(63) Continuation of application No. 11/232,748, filed on Sep. 22, 2005, now Pat. No. 7,378,940.

(51) Int. Cl.
*H04Q 5/22* (2006.01)
(52) U.S. Cl. .................. 340/10.5; 340/10.1; 340/572.1; 705/28; 235/436
(58) Field of Classification Search .............. 340/572.1, 340/572.4, 572.5, 572.8; 235/375–385, 431–439; 700/215–217, 224–227
See application file for complete search history.

(56) References Cited

U.S. PATENT DOCUMENTS

| | | | | |
|---|---|---|---|---|
| 5,151,684 A | * | 9/1992 | Johnsen | 340/568.1 |
| 5,642,103 A | * | 6/1997 | Tokuda et al. | 340/10.51 |
| 6,429,776 B1 | * | 8/2002 | Alicot et al. | 340/572.1 |
| 6,552,663 B2 | * | 4/2003 | Swartzel et al. | 340/572.1 |
| 6,563,425 B2 | * | 5/2003 | Nicholson et al. | 340/572.7 |
| 7,055,750 B2 | * | 6/2006 | Carrender | 235/472.01 |
| 2001/0045893 A1 | * | 11/2001 | Swartzel et al. | 340/572.1 |
| 2002/0105424 A1 | * | 8/2002 | Alicot et al. | 340/572.1 |
| 2005/0218218 A1 | * | 10/2005 | Koster | 235/383 |
| 2005/0237201 A1 | * | 10/2005 | Nedblake | 340/572.8 |
| 2006/0081713 A1 | * | 4/2006 | Carrender | 235/462.46 |
| 2007/0034694 A1 | * | 2/2007 | Jensen et al. | 235/439 |
| 2007/0152058 A1 | * | 7/2007 | Yeakley et al. | 235/462.01 |

* cited by examiner

*Primary Examiner*—George A Bugg
*Assistant Examiner*—Travis R Hunnings
(74) *Attorney, Agent, or Firm*—Martin & Associates LLC; Derek P. Martin

(57) ABSTRACT

A pallet content identification mechanism is a small electronic device that is attached to a pallet. The pallet content identification mechanism reads RFID tags on the pallet using an RFID portal scanner, converts the RFID information into corresponding barcode information, and transmits the corresponding barcodes to a barcode-based inventory control system in a format that looks like output of a wireless barcode scanner. In this manner the pallet identification mechanism allows a user to benefit from RFID technology on the pallet while still using barcode technology in the barcode-based inventory control system.

7 Claims, 4 Drawing Sheets

PALLET CONTENT IDENTIFICATION MECHANISM THAT CONVERTS RFID INFORMATION TO CORRESPONDING BARCODE INFORMATION

CROSS-REFERENCE TO RELATED APPLICATION

This patent application is a continuation of a patent application with the same title, U.S. Ser. No. 11/232,748 filed on Sep. 22, 2005, which is incorporated herein by reference.

BACKGROUND OF THE INVENTION

1. Technical Field

This invention generally relates to inventory control systems, and more particularly relates to using radio frequency identification (RFID) information in a barcode environment.

2. Background Art

Radio Frequency Identification (RFID) presents a new paradigm for inventory control. Each item that needs to be tracked is equipped with an RFID tag, which is a small, passive electronic device that may be attached to or embedded into a product or its packaging. In an RFID system, a scanner sends out radio-frequency energy. This radio-frequency energy provides power to the RFID tags. In response, the RFID tags transmit their identifying information. RFID thus allows an entire pallet or truck to be scanned, thereby providing easy inventory control. An RFID system may also include active emitters with a battery that allows the RFID tag itself to transmit the signal instead of the scanner providing the power via the radio frequency energy.

When one compares RFID to current barcode technology, one readily appreciates the advantages of RFID. If a truck or pallet is stacked with many different cartons of products, the bar code on each carton must be located and scanned. This necessarily requires unpacking pallets to scan all the cartons on a pallet. With an RFID system, all the cartons, and even the individual products in the cartons, may be scanned without unpacking. Due to the hands-off nature of RFID scanning, inventory control is moving in the direction of adopting RFID technology.

Wal Mart and the U.S. Department of Defense have mandated that their suppliers have RFID tags on all items that cost more than one dollar. As a result, many suppliers are rushing to install RFID systems. While the adoption of RFID technology may be done quickly for large companies that have a large budget for converting their inventory control systems from barcode to RFID, many smaller companies, distributors, and retailers will be much slower to install RFID systems due to the relatively large cost of completely converting from barcode to RFID. This creates a potential mismatch between RFID and existing barcode technologies. Without a way to easily transfer RFID information into a barcode system without a large investment of capital, the smaller distributors and retailers will not be able to benefit from RFID inventory control until they completely convert to a full-blown RFID system, which may be prohibitively expensive.

DISCLOSURE OF INVENTION

According to the preferred embodiments, a pallet content identification mechanism is a small electronic device that is attached to a pallet. The pallet content identification mechanism reads RFID tags on the pallet using an RFID portal scanner, converts the RFID information into corresponding barcode information, and displays the corresponding barcodes on a small display. These barcodes may then be scanned by a conventional barcode scanner, thereby allowing all of the items on the pallet to be scanned into the barcode system without unpacking the pallet. The pallet identification mechanism allows a user to benefit from RFID technology on the pallet while still using barcode technology in the inventory control system.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

A pallet content identification mechanism provides a simple and easy-to-use bridge between RFID data and traditional barcode systems. The pallet content identification mechanism is attached to a pallet, and includes an RFID scanner that is capable of scanning RFID data for the items on the pallet. A RFID to barcode conversion mechanism reads the RFID data from the scanner, converts the RFID data into corresponding barcode information, and outputs the corresponding barcode information to a barcode-based inventory control system. In this manner the RFID data from the items on the pallet is converted and input into a barcode-based inventory control system. In one specific embodiment, the barcode information is output to a display on the pallet content identification mechanism, which may then be scanned by a traditional barcode scanner.

Figure 1:
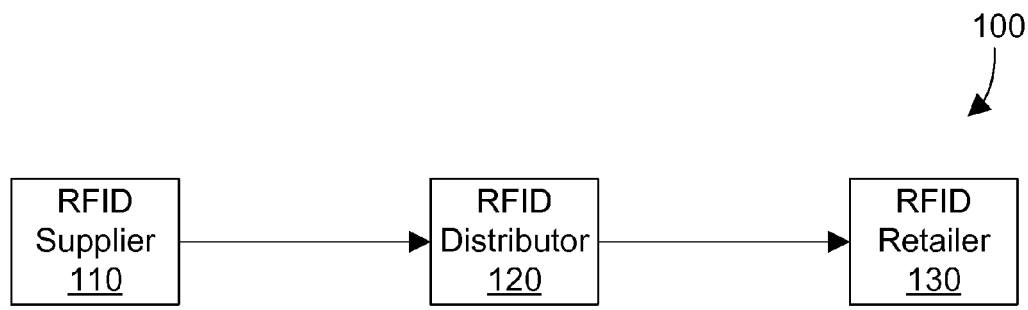
FIG. 1 is a block diagram showing an RFID supply chain.

Referring to FIG. 1, an RFID supply chain is shown, and includes an RFID supplier 110 coupled to an RFID distributor 120, which is coupled to an RFID retailer 130. Note that in reality, there are many suppliers, many distributors, and many retailers. We assume each of these entities 110, 120 and 130 are fully RFID compatible. This provides for very efficient control of inventory as it passes through the supply chain.

Figure 2:
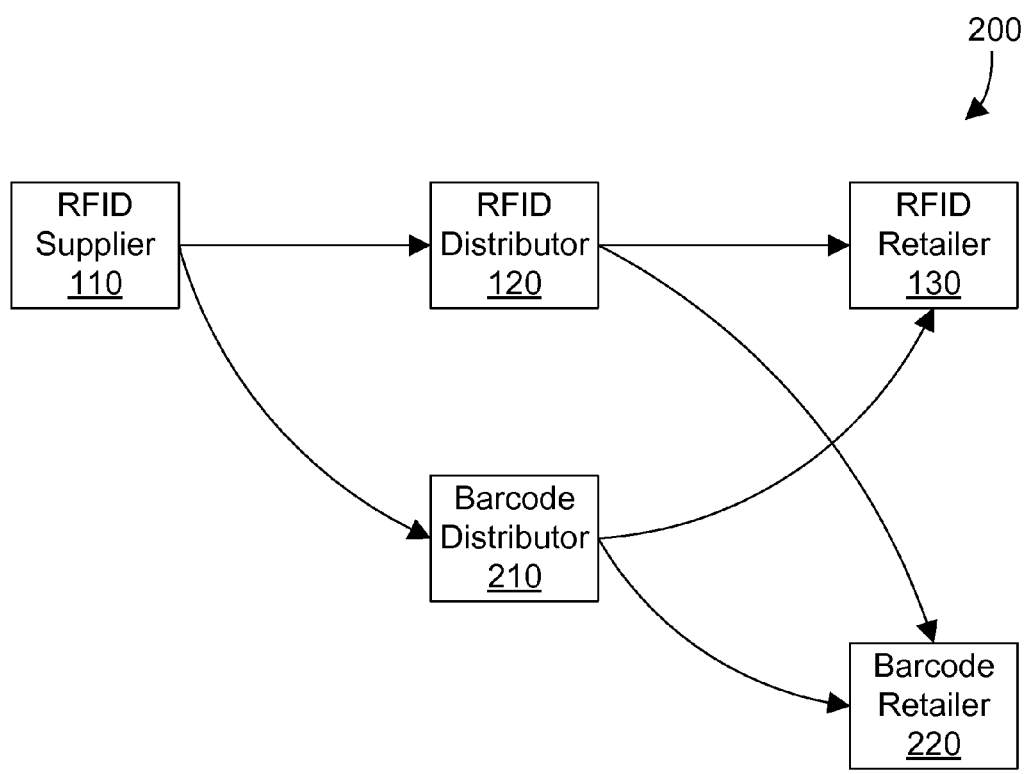
FIG. 2 is block diagram showing how UPC distributors and retailers may receive goods from the RFID supply chain.

One problem with the RFID supply chain shown in FIG. 1 is that RFID must be fully supported at each stage of the supply chain. Converting a warehouse or distribution center from currently-used barcode technology to RFID technology requires a substantial investment in new equipment and training. Many distributors and small retailers have already invested a considerable sum of money in barcode inventory control systems, and simply cannot afford to make the jump to RFID all at once. As a result, in the real world we will likely see a mix of RFID and barcode technology at many stages in the supply chain, as shown in FIG. 2. We see from this simple figure that a barcode distributor 210 may receive goods from an RFID supplier 110, and may ship goods to an RFID retailer 130, or to a barcode retailer 220. A barcode retailer 220 may also receive goods from an RFID distributor 120. This mixture of RFID and barcode systems creates a potential problem in the supply chain. For example, in an RFID inventory control system, pallets may be tightly wrapped with stretch film because the RFID tags may be scanned without unloading the pallet. In a barcode inventory control system, in contrast, the cartons on a pallet must each be scanned with a barcode reader, which often requires unloading the pallet to provide access to all of the barcodes on all of the cartons. If a pallet of RFID goods is tightly wrapped with stretch film and arrives at a distribution center that does not have RFID capability, but has barcode capability, each carton on the pallet will have to be scanned into the barcode inventory system.

Figure 3:
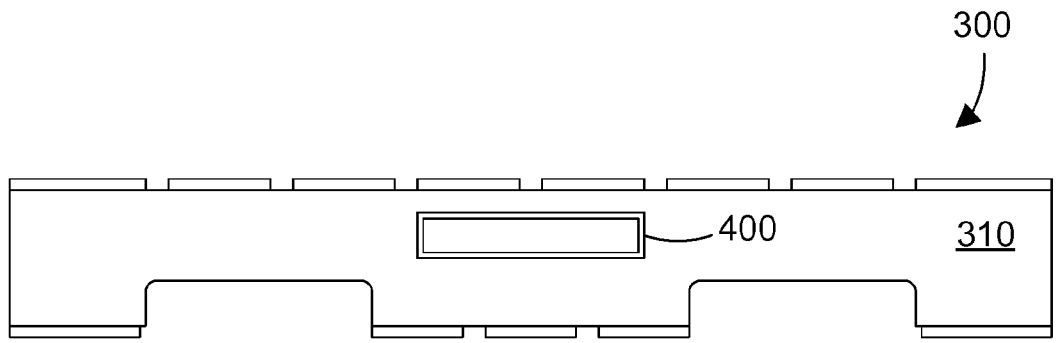
FIG. 3 is side view of a pallet that includes the pallet content identification mechanism in accordance with the preferred embodiments.

The preferred embodiments provide a simple and easy-to-use interface between RFID information and a barcode inventory system. Referring to FIG. 3, a pallet 300 in accordance with the preferred embodiments includes a support structure 310 that provides structural support that allows a forklift or other machine to lift the pallet 300 when fully loaded with goods. Attached to the support structure 310 is a pallet content identification mechanism 400 in accordance with the preferred embodiments. The pallet content identification mechanism 400 converts the RFID information from goods on the pallet into corresponding barcode information, and outputs the barcode information so it can be used by a barcode-based inventory control system.

Figure 4:
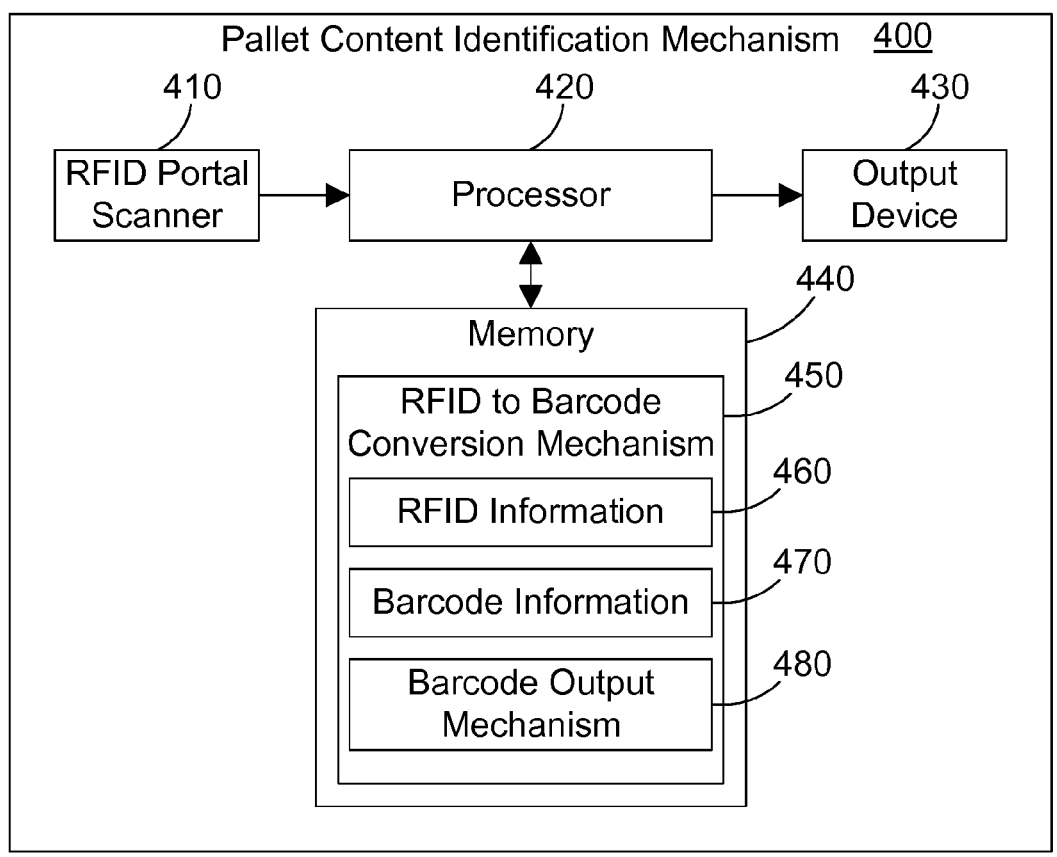
FIG. 4 is a block diagram of a pallet content identification mechanism in accordance with the preferred embodiments.

Referring to FIG. 4, the pallet content identification mechanism 400 includes a processor 420 coupled to an RFID portal scanner 410, a memory 440, and an output device 430. The RFID portal scanner 410 is preferably a known RFID scanner that has the capability of collecting the RFID information from all goods on the pallet (300 in FIG. 3). Note that RFID portal scanner 410 may be place in any suitable location on the pallet to assure all items on the pallet may be scanned. The memory 440 preferably includes an RFID to barcode conversion mechanism 450. The RFID to barcode conversion mechanism 450 receives RFID information from the RFID portal scanner 410, converts the RFID information 460 to corresponding barcode information 470, and includes a barcode output mechanism 480 that outputs the barcode information 470 to the output device 430. In one specific implementation in accordance with the preferred embodiments, the output device 430 is a serial interface to a cable that is connected to a barcode-based inventory control system. In a second specific implementation in accordance with the preferred embodiments, the output device 430 is a wireless transmitter that transmits the barcode information 470 via wireless interface to a wireless receiver that is part of a barcode-based inventory control system. If the output device 430 is a wireless transmitter, the transmission could be formatted to look like the input from a wireless barcode scanner, allowing the pallet control identification mechanism 400 to communicate with the barcode-based inventory control system in the same way that a wireless barcode scanner communicates.

Note that barcode information 470 may be numerical information that corresponds to products, or may be actual barcode representations of the numerical information, depending on the format expected by the device receiving the information from the output device 430. If the barcode information 470 is numerical information, and if the device receiving from the output device 430 expects actual barcode representations of the numerical information, the barcode output mechanism 480 could convert the numerical information into a corresponding barcode representation.

Figure 5:
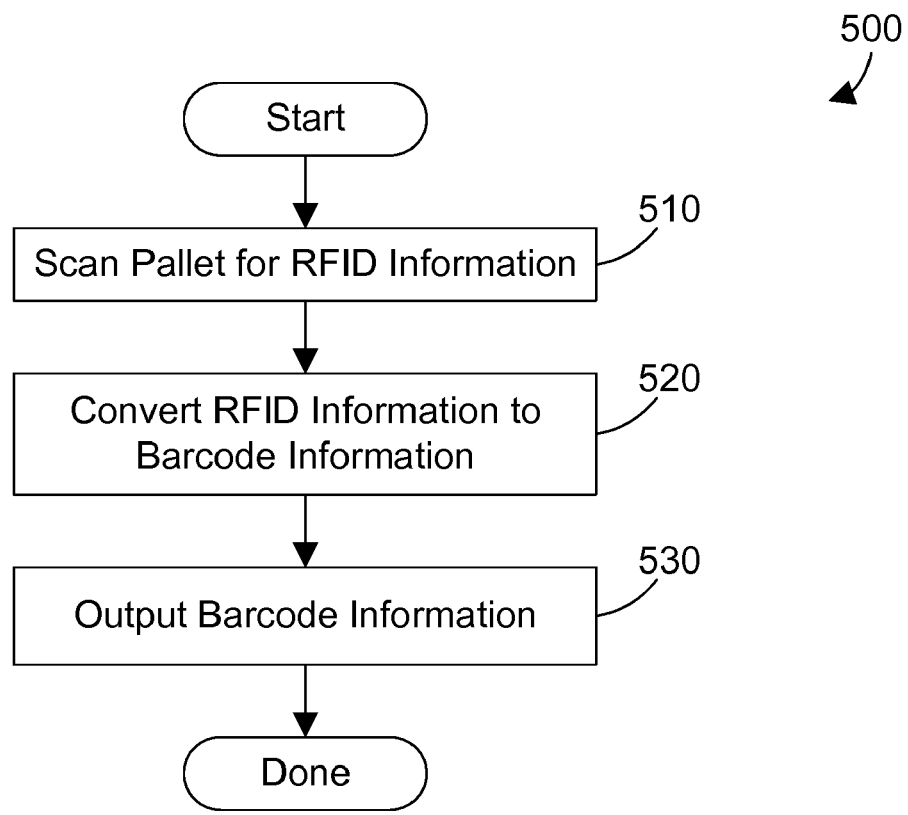
FIG. 5 is a flow diagram of a method in accordance with the preferred embodiments

Referring to FIG. 5, a method 500 in accordance with the preferred embodiments is performed by the RFID to barcode conversion mechanism 440 shown in FIG. 4. First, the pallet is scanned for RFID information (step 510). This is preferably done using RFID portal scanner 410 shown in FIG. 4. The RFID information is converted to barcode information (step 520). The barcode information is then output (step 530). Note that known RFID portal scanners include the capability of generating a bill of material for all items scanned. This bill of material could be maintained as the RFID information is converted to barcode information, thereby automatically generating a Bill of Material for the pallet based on the converted barcode information.

Figure 6:
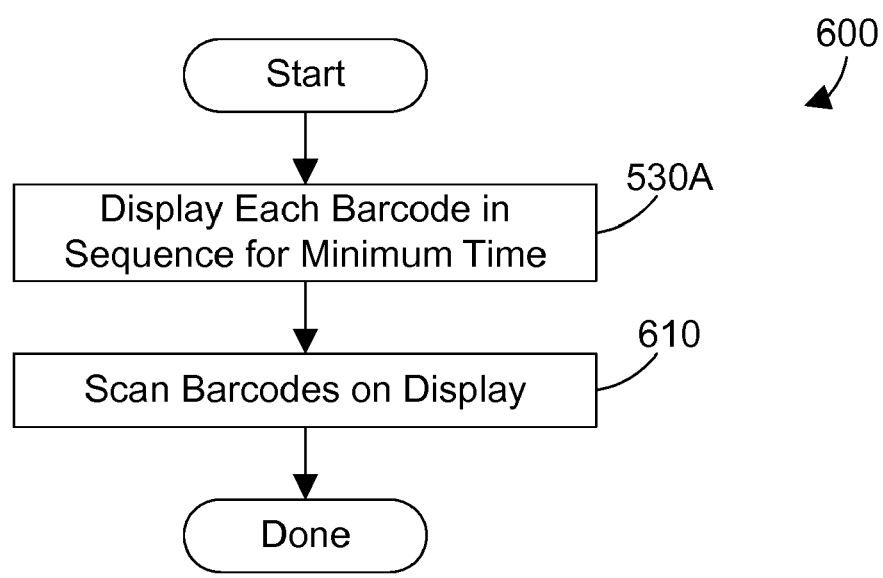
FIG. 6 is a block diagram of steps showing how the barcodes maybe displayed and scanned in accordance with the preferred embodiments.

Referring to FIG. 6, a method 600 shows one specific implementation of step 530, followed by a subsequent step in accordance with the preferred embodiments. The barcode information could be output in the form of a sequence of barcodes on a suitable display, such as a liquid crystal display (LCD). Each barcode could be displayed in a defined sequence, with each barcode being displayed for some minimum time period (step 530A). The barcodes on the display may then be scanned (step 610) using known barcode scanners.

Figure 7:
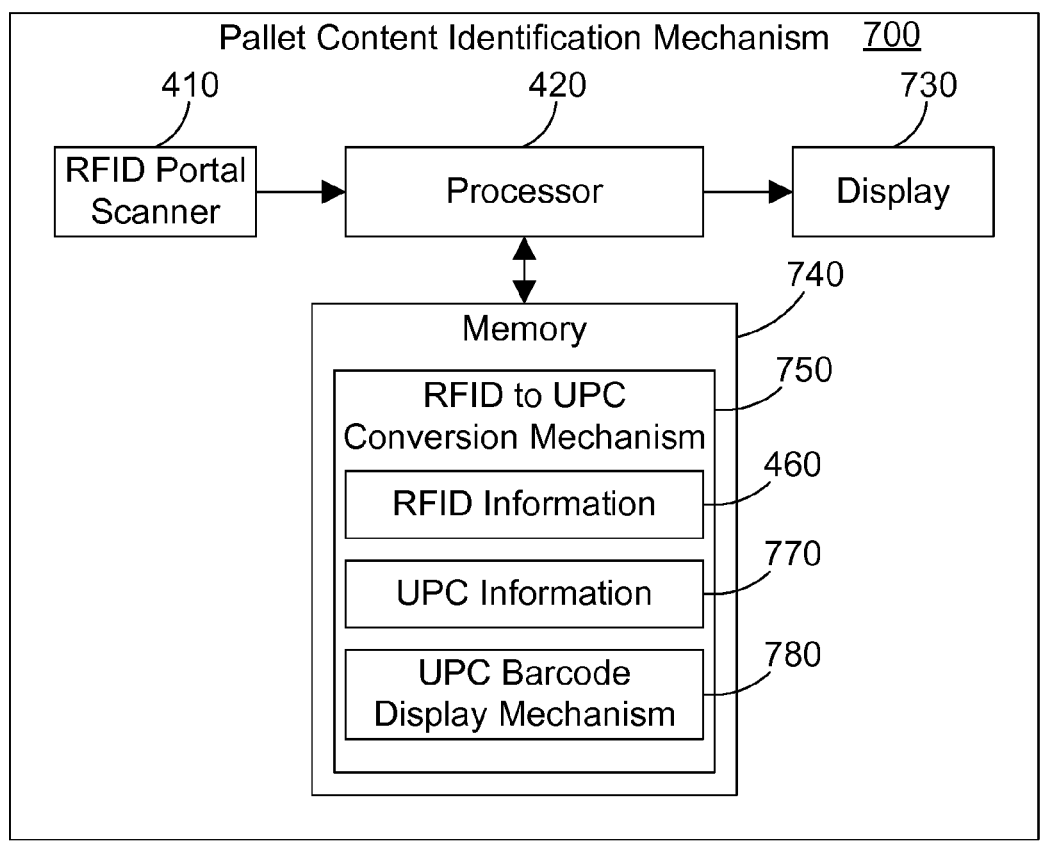
FIG. 7 is a block diagram of one specific implementation of the pallet content identification mechanism that displays UPC barcodes in accordance with the preferred embodiments.

FIG. 7 shows one specific implementation of the pallet content identification mechanism of the preferred embodiments. In this specific implementation, the barcode information is in uniform price code (UPC) format, and the output of the barcode information is the display of the UPC barcode information on a display 730. Thus, the RFID to UPC conversion mechanism 750 in memory 740 reads RFID information 460 from an RFID portal scanner 410. The RFID information 460 is converted to corresponding UPC information 770. The UPC information 770 may then be output by the UPC barcode display mechanism 780 to the display 730 in the form of bar codes on the display that may be scanned by any conventional barcode reader. The display of UPC barcodes on the display 730 allows a person with a handheld scanner to repeatedly scan the display 730 until UPC barcodes for all the items on the pallet have been scanned. Display 730 is preferably a liquid crystal display (LCD) with sufficient contrast between black segments and background to allow efficiently displaying barcodes in a format that can be readily scanned using existing barcode scanners. Display 730 preferably has a flat, non-shiny surface that does not impede the scanning of the barcodes displayed thereon.

Note that the pallet content identification mechanism 700 could include a sensor that would allow the display 730 to be normally off until a scanning laser contacts the sensor, indicating that someone wants to scan the display 730 for barcodes. The pallet content identification mechanism 700 could also include one or more buttons that allow a user to perform simple functions, such as starting the display of the sequence of barcodes, halting the sequence, continuing the display of the sequence, etc.

The preferred embodiments herein extend to both a pallet content identification mechanism, and to a pallet in combination with a pallet content identification system. In addition, the pallet referred to herein as representative of any suitable inventory control structure, and the preferred embodiments expressly extend to any and all inventory control structures, including without limitation pallets, trucks, trailers, shipping containers, etc.

The preferred embodiments provide a simple device that may be attached to a pallet in a manner that the device may scan the pallet for RFID information, convert the RFID information into barcode information, and display the barcode information on a display so it can be scanned. This device provides an inexpensive yet effective bridge between RFID technology and existing barcode inventory control systems.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
    at least one processor;
    a radio frequency identification (RFID) scanner coupled to the at least one processor;
    a display coupled to the at least one processor;
    a memory coupled to the at least one processor;
    an RFID to barcode conversion mechanism that receives RFID information from the RFID scanner for a plurality of products simultaneously present on an inventory control structure in proximity to the RFID scanner, converts the RFID information received from the RFID scanner into a corresponding plurality of barcodes, and that outputs the plurality of barcodes to the display in succession, with each barcode being displayed for a selected minimum time period.

2. The apparatus of claim 1 wherein the plurality of barcodes each comprise uniform price code (UPC) barcode information.

3. The apparatus of claim 1 further comprising a transmitter coupled to the processor that transmits the barcode information via wireless interface to a wireless receiver that is part of a barcode-based inventory control system in a format that looks like input from a wireless barcode scanner in the barcode-based inventory control system.

4. An inventory control structure comprising:
    (A) a support structure that supports products for shipping; and
    (B) a content identification mechanism attached to the support structure, the content identification mechanism comprising:
        at least one processor;
        a radio frequency identification (RFID) scanner coupled to the at least one processor;
        a display coupled to the at least one processor;
        a memory coupled to the at least one processor; and
        an RFID to barcode conversion mechanism that receives RFID information from the RFID scanner for a plurality of products simultaneously present on the support structure, converts the RFID information received from the RFID scanner into a corresponding plurality of barcodes, and that outputs the plurality of barcodes to the display in succession, with each barcode being displayed for a selected minimum time period.

5. The inventory control structure of claim 4 wherein the corresponding barcode information comprises uniform price code (UPC) barcode information.

6. The inventory control structure of claim 4 further comprising a transmitter coupled to the processor that transmits the barcode information via wireless interface to a wireless receiver that is part of a barcode-based inventory control system in a format that looks like input from a wireless barcode scanner in the barcode-based inventory control system.

7. The inventory control structure of claim 4 wherein the support structure comprises a pallet.

* * * * *